July 12, 1955   J. E. LE GROS ET AL   2,713,078
STORAGE BATTERY PLATE AND METHOD
Filed Sept. 11, 1950

*INVENTORS*
*John E. LeGros &*
BY *George D. Smithwick*
Boyken, Mohler & Beckley
ATTORNEYS

United States Patent Office 2,713,078
Patented July 12, 1955

2,713,078

STORAGE BATTERY PLATE AND METHOD

John E. Le Gros, Pittsburg, and George D. Smithwick, San Francisco, Calif., assignors, by direct and mesne assignments, of one-third to Donald G. Goin, Montebello, Calif., one-third to Marilyn Smithwick and one-third to said Le Gros Application September 11, 1950, Serial No. 184,282

4 Claims. (Cl. 136—19)

This invention relates to lead-acid storage batteries and more particularly to the positive and negative plates of such batteries.

The general practice in preparing the negative and positive plates of storage batteries such as are employed for starting and lighting in automobiles is to apply a paste of lead oxide to a generally flat plate having a lattice work or grid formed therein. This lead oxide is the active material which acts with the acid electrolyte to produce spongy lead on the negative plate and lead peroxide on the positive plate when the battery is formed (i. e. put into an initially charged condition).

The lead peroxide on the positive plate undergoes physical changes during charging and discharging which loosen the bond between the particles of the paste and between the paste and the grid. This results in dislodging portions of the active material of the plate which then drop to the bottom of the battery. This loss of material reduces the capacity of the battery and shortens its life.

Although various attempts have been made in the past to increase the bond of the paste, such as by increasing the density of the paste, these attempts so far as we are aware have not been entirely successful. On the contrary they have usually resulted in reducing the output of the battery by reducing the porosity of the paste thereby reducing the accessibility of the acid to the active material in the plates.

The main object of the present invention is the provision of a battery plate wihch eliminates the above mentioned disadvantages.

Another object of the invention is the provision of a means for preventing dislodgment of the electrode paste without affecting the chemical action between the electrolyte and the paste which is necessary for the proper functioning of the battery.

Still another object of the invention is provision of a plate which permits the use of pastes of lighter density than heretofore possible thereby increasing the available capacity of the battery.

Yet another object of the invention is the provision of a plate which will obviate the necessity of separators between adjacent plates thereby reducing the cost and internal resistance of the battery.

Figure 1:
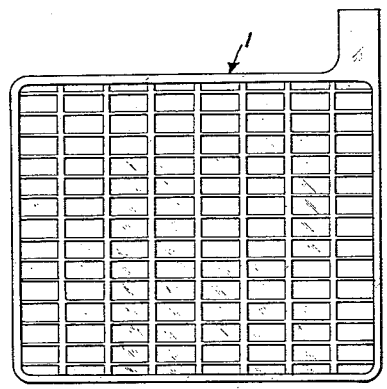
Fig. 1 is a side elevational view of a conventional paste plate commonly employed in lead-acid storage batteries.

In general the present invention contemplates the provision of a web-like coating on the surfaces of the battery plate generally designated 1 (Figs. 1, 2, 3) for the purpose of preventing dislodgment of the lead oxide or lead peroxide which is secured thereto. This web-like coating achieves this object by cross-connecting the material in adjacent grids and also by providing lateral support for the material in each grid by connecting it with the metal from which the grid is formed.

Figure 2:
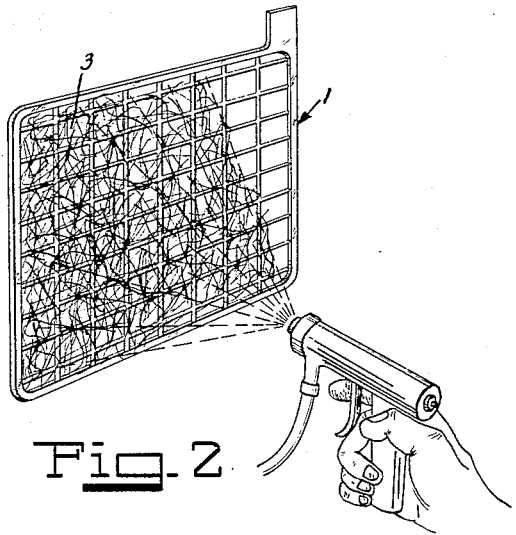
Fig. 2 is a perspective view of the plate of Fig. 1 showing schematically the method of coating the same.
Figure 3:
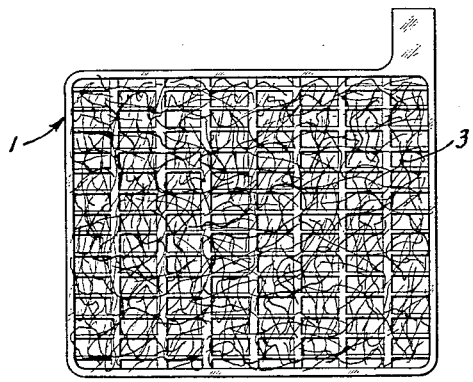
Fig. 3 is a side elevational view of the finished plate showing the web-like coating applied thereon.

By the present invention, a coating of acid resistant plastic is applied to the plate by means of a spray gun as shown in Fig. 2. This produces a light web-like coating which adheres to the grid metal and the paste imbedded therein. This coating 3 is sufficiently resilient to prevent dislodgment of particles of the paste even during buckling of the plate.

We have found that the use of a web-like coating of a copolymer of vinylidene chloride and acrylonitrile (known commercially as Saran F–120) results in practically no no change in capacity and performance of the battery. Furthermore, the sulphuric acid which constitutes the electrolyte has little or no effect on the plastic coating, nor has the oxidation and reduction reactions which occur on the battery. Vinylidene chloride is one of the few plastics which is little effected by acid and this is one reason for its use. Other plastics which are not affected by acids or by the oxidation and reduction reactions which occur in the battery may be used if they can be applied to the plate in a manner permitting the usual chemical reaction between the active material and the electrolyte.

When a spray gun is employed to deposit the plastic on the plate, the plastic in a solution of a suitable solvent forms solid fibers upon meeting the air jet. These fibers which are propelled against the plate undergo additional drying upon further evaporation of the solvent thereby increasing adherence of the plastic to the plate. These fibers are preferably very fine so that the resultant density of the fibers on the plate may be relatively great without covering more than a slight percentage of the available active surface of the plate.

It is pertinent to note in this connection that the fibers build up a coating comprising a series of minute layers on top of each other. Thus, although the projected area of the active material of the plate available to the electrolyte appears to be considerably reduced, the reduction is in fact not great because the electrolyte still has access to the plate between adjacent layers of fibers and between the fibers themselves.

The plastic may be sprayed on the plates at any time after pasting and either before or after the paste has dried.

The dislodgment of material from the positive plate is relatively greater than from the negative plate and for this reason spraying of only the positive plate will effectively improve the capacity and life of the battery. However, we have found practically no reduction in performance of the battery when the negative plate is also coated as hereinbefore described.

By coating both negative and positive plates, we have found that the separators normally employed to space apart the adjacent plates may be eliminated from the battery.

Such separators are usually formed from a very thin sheet of wood or other porous material provided with vertically extending ribs to permit circulation of the electrolyte to and from the adjacent plate.

Figure 4:
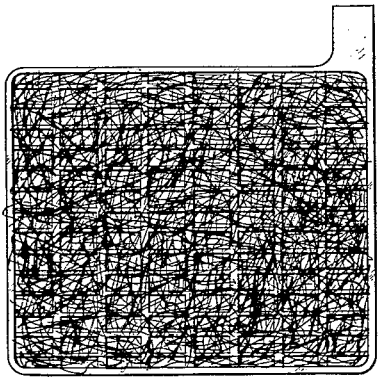
Fig. 4 is a side elevational view of a plate showing a relatively heavy coating thereon for the purpose of eliminating the separators in the battery.

By spraying the plates for a relatively longer period of time a heavier coating of plastic may be deposited on the plate as shown in Fig. 4. It should be noted that the web-like coating is not continuous on either of the plates of Fig. 3 and 4. However, the building up of layers of the plastic fibers should be carried out to achieve a relatively greater thickness when such coatings are to be employed as separators. In this manner short-circuiting of adjacent plates may effectively be prevented.

By the present invention it will be obvious that pastes of lighter density may be employed on the grid inasmuch as the mechanical strength, heretofore, provided by the paste itself is now provided by the plastic coating.

Figure 5:
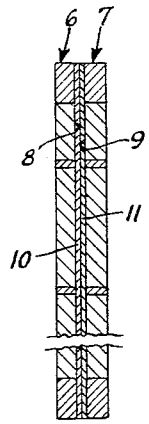
Fig. 5 is a greatly enlarged cross-sectional view through the plates of a storage battery showing the plates in place with the coatings thereon acting as separators.

Referring to Fig. 5 wherein two adjacent plates 6, 7 are shown in cross-section it is seen that the adjacent surfaces 8, 9 respectively of said plates are spaced apart by plastic coatings 10, 11 sprayed on the plates in the manner hereinbefore described.

In such a case the electrolyte still has access to the plates through the web-like coating of plastic but short circuiting is effectively prevented.

Batteries employing plates hereinbefore described have been tested by means of the standard 20 hour capacity test and also the "cranking test" at 300 amperes. In each case the presence of the plastic on the plates caused practically no reduction in access of the electrolyte to the plate according to the results of such tests.

The complete elimination of the usual loss of active material from the plates of course increases the life of the battery. By the present invention such increase in the life of the battery is achieved without any deleterious effects.

The particular embodiment of the invention hereinbefore described is not to be taken as restrictive of the invention as it is obvious that variations may be made without departing from the spirit of the invention.

Other plastics or material that is acid resistant and resistant to the oxidation and reduction reactions that occur in a battery, and that will adhere to the paste and grid yet permit the usual chemical reaction between the active material and the electrolyte, is suitable for use. The material herein mentioned is preferable, but it is the characteristics of the material that are important, and not the precise material.

The fact that the fibers are indiscriminately arranged on the grid and paste insures greater access of the electrolyte to the paste than were the fibers arranged in the woven pattern, and the results are much better since there are no set lines of strength or of weakness.

We claim:

1. The method of preventing the outfall of active material from a battery plate having a grid filled with a paste of active material comprising the step of; impacting threads of acid resistant plastic against the paste and grid exposed on at least one side of said plate with said threads in indiscriminately crossing relationship leaving interstices between threads directly against said plate to admit electrolyte to the said paste.

2. The method of preventing the outfall of active material from a battery plate having a grid filled with a paste of active material comprising the step of; spraying a network of indiscriminately arranged fibers of acid resistant plastic against the paste and grid exposed at one side of said plate leaving interstices between the electrode at the surface of said one side for passage of electrolyte to said paste.

3. A battery plate that includes a grid and an active paste enclosed thereby, a network of indiscriminately arrange relatively fine fibers of acid resistant plastic material adhered to the exposed paste and grid substantially all of said fibers being in engagement with said exposed paste and grid and adherently secured to each other to provide a relatively thin layer on said one side at one side of said plate for holding said paste in said grid, said fibers being arranged to form interstices between them for passage of electrolyte to said paste.

4. A combination battery plate and separator member adapted to be positioned in a battery with a plurality of identical members in side by side relationship with the adjacent plates of said members in spaced opposed relationship, each of said members including a battery plate having a grid filled with paste to provide a pair of opposite surfaces along which said paste is adapted to be engaged by a liquid electrolyte, a network of indiscriminately arranged relatively fine fibers of acid resistant plastic material adhered to said exposed opposite surfaces for holding said paste in said grid substantially all of said fibers being in engagement with said exposed paste and grid and adherently secured to each other to provide a relatively thin layer on said one side, said fibers being arranged to form interstices between them for passage of electrolyte to said paste.

References Cited in the file of this patent

UNITED STATES PATENTS

| | | |
|---|---|---|
| 760,897 | Meygret | May 24, 1904 |
| 776,192 | Meygret | Nov. 29, 1904 |
| 1,710,617 | Haddon | Apr. 23, 1929 |
| 2,048,651 | Norton | July 21, 1936 |
| 2,108,748 | Harner | Feb. 15, 1938 |
| 2,256,105 | Shank | Sept. 16, 1941 |
| 2,335,757 | Hall | Nov. 30, 1943 |
| 2,357,392 | Francis Jr. | Sept. 5, 1944 |
| 2,374,540 | Hall | Apr. 24, 1945 |
| 2,391,515 | Richard et al. | Dec. 25, 1945 |
| 2,482,062 | Hanson | Sept. 13, 1949 |
| 2,484,787 | Grant | Oct. 11, 1949 |